United States Patent
Ichimasa et al.

(10) Patent No.: US 10,202,882 B2
(45) Date of Patent: Feb. 12, 2019

(54) FAULT DIAGNOSIS DEVICE FOR EXHAUST PIPE FUEL INJECTOR

(71) Applicant: ISUZU MOTORS LIMITED, Shinagawa-ku, Tokyo (JP)

(72) Inventors: Toshio Ichimasa, Fujisawa (JP); Yukihiro Kawashima, Fujisawa (JP); Tomoya Kaji, Tokyo (JP); Kouji Sakumoto, Fujisawa (JP); Shunya Matsushita, Fujisawa (JP)

(73) Assignee: ISUZU MOTORS LIMITED, Shinagawa-Ku, Tokyo (JP)

( * ) Notice: Subject to any disclaimer, the term of this patent is extended or adjusted under 35 U.S.C. 154(b) by 0 days.

(21) Appl. No.: 15/528,293

(22) PCT Filed: Nov. 17, 2015

(86) PCT No.: PCT/JP2015/082297
§ 371 (c)(1),
(2) Date: May 19, 2017

(87) PCT Pub. No.: WO2016/080402
PCT Pub. Date: May 26, 2016

(65) Prior Publication Data
US 2017/0328258 A1 Nov. 16, 2017

(30) Foreign Application Priority Data

Nov. 20, 2014 (JP) .................................. 2014-235919

(51) Int. Cl.
*F01N 9/00* (2006.01)
*F02D 45/00* (2006.01)
(Continued)

(52) U.S. Cl.
CPC ............. *F01N 9/002* (2013.01); *F01N 3/025* (2013.01); *F01N 3/0253* (2013.01); *F01N 11/00* (2013.01);
(Continued)

(58) Field of Classification Search
CPC ........ F01N 3/0253; F01N 3/2033; F01N 3/36; F01N 9/002; F01N 2610/03
See application file for complete search history.

(56) References Cited

U.S. PATENT DOCUMENTS 6,085,132 A    7/2000  Ishii et al.
2004/0144087 A1  7/2004  Kondou et al.
(Continued)

FOREIGN PATENT DOCUMENTS

CN    1517524 A     8/2004
CN    103201469 A   7/2013
(Continued)

OTHER PUBLICATIONS

Machine translation of JP2012-102650A, accessed on Jun. 20, 2018.*
(Continued)

*Primary Examiner* — Jonathan Matthias
(74) *Attorney, Agent, or Firm* — Procopio, Cory, Hargreaves & Savitch LLP

(57) ABSTRACT

A fault diagnosis device for an exhaust pipe fuel injector that diagnoses a normality or an abnormality of the exhaust pipe fuel injector which injects a fuel according to an instructed fuel injection amount, includes: a storage unit which stores a regeneration duration and an instructed fuel injection amount in the regeneration duration; a calculation unit which calculates an instructed fuel injection amount per unit time in the regeneration duration; and a fault diagnosis unit which diagnoses that the exhaust pipe fuel injector is abnor- (Continued)

mal when the instructed fuel injection amount per unit time in the regeneration duration exceeds a fault threshold, and diagnoses that the exhaust pipe fuel injector is normal when the instructed fuel injection amount per unit time in the regeneration duration does not exceed the fault threshold.

3 Claims, 3 Drawing Sheets

(51) Int. Cl.
   *F01N 3/025* (2006.01)
   *F01N 11/00* (2006.01)
(52) U.S. Cl.
   CPC .......... *F02D 45/00* (2013.01); *F01N 2550/05* (2013.01); *F01N 2610/03* (2013.01); *F01N 2900/10* (2013.01); *F01N 2900/1602* (2013.01); *F01N 2900/18* (2013.01)

(56) References Cited

U.S. PATENT DOCUMENTS

| | | | |
|---|---|---|---|
| 2009/0019836 A1 | 1/2009 | Nagaoka et al. | |
| 2010/0154387 A1* | 6/2010 | Shibata | F01N 3/0871 60/285 |
| 2012/0090303 A1 | 4/2012 | Numata et al. | |
| 2013/0125543 A1 | 5/2013 | Hoover | |
| 2013/0269427 A1 | 10/2013 | Nagaoka et al. | |

FOREIGN PATENT DOCUMENTS

| | | |
|---|---|---|
| CN | 103261597 A | 8/2013 |
| JP | 2002-250248 A | 9/2002 |
| JP | 2004-132223 A | 4/2004 |
| JP | 2006-316757 A | 11/2006 |
| JP | 2006-316758 A | 11/2006 |
| JP | 2008-031968 A | 2/2008 |
| JP | 2012-102650 A | 5/2012 |
| JP | 2012-127255 A | 7/2012 |
| JP | 2012-127301 A | 7/2012 |
| JP | 2014-129767 A | 7/2014 |

OTHER PUBLICATIONS

International Search Report and Written Opinion for PCT App No. PCT/JP2015/082297 dated Feb. 9, 2016, 9 pgs.
Extended European Search Report for related EP App No. 15861552.6 dated Sep. 10, 2018, 7 pgs.
First Office Action for related CN App No. 201580063073.8 dated Sep. 5, 2018, 12 pgs.

* cited by examiner

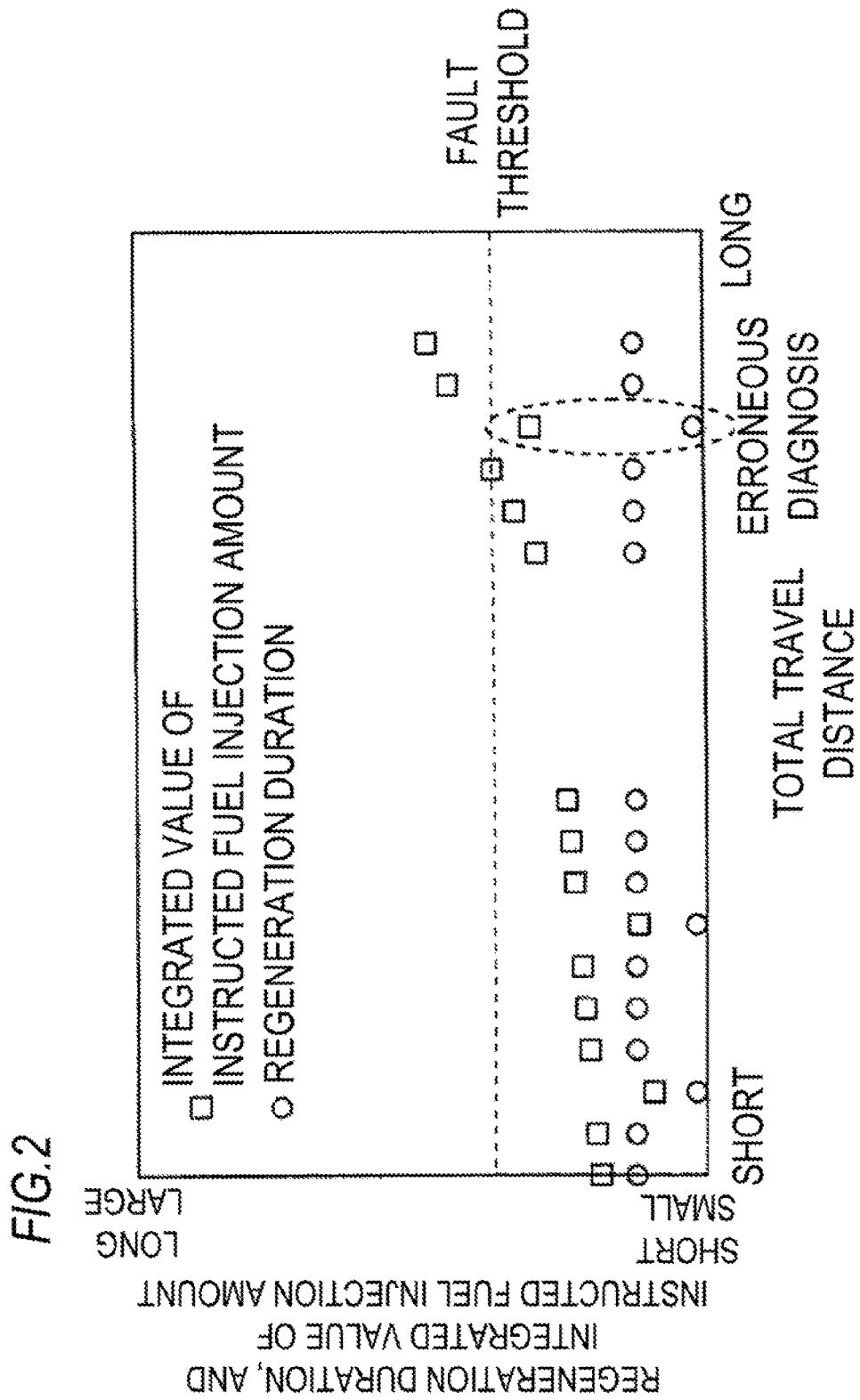

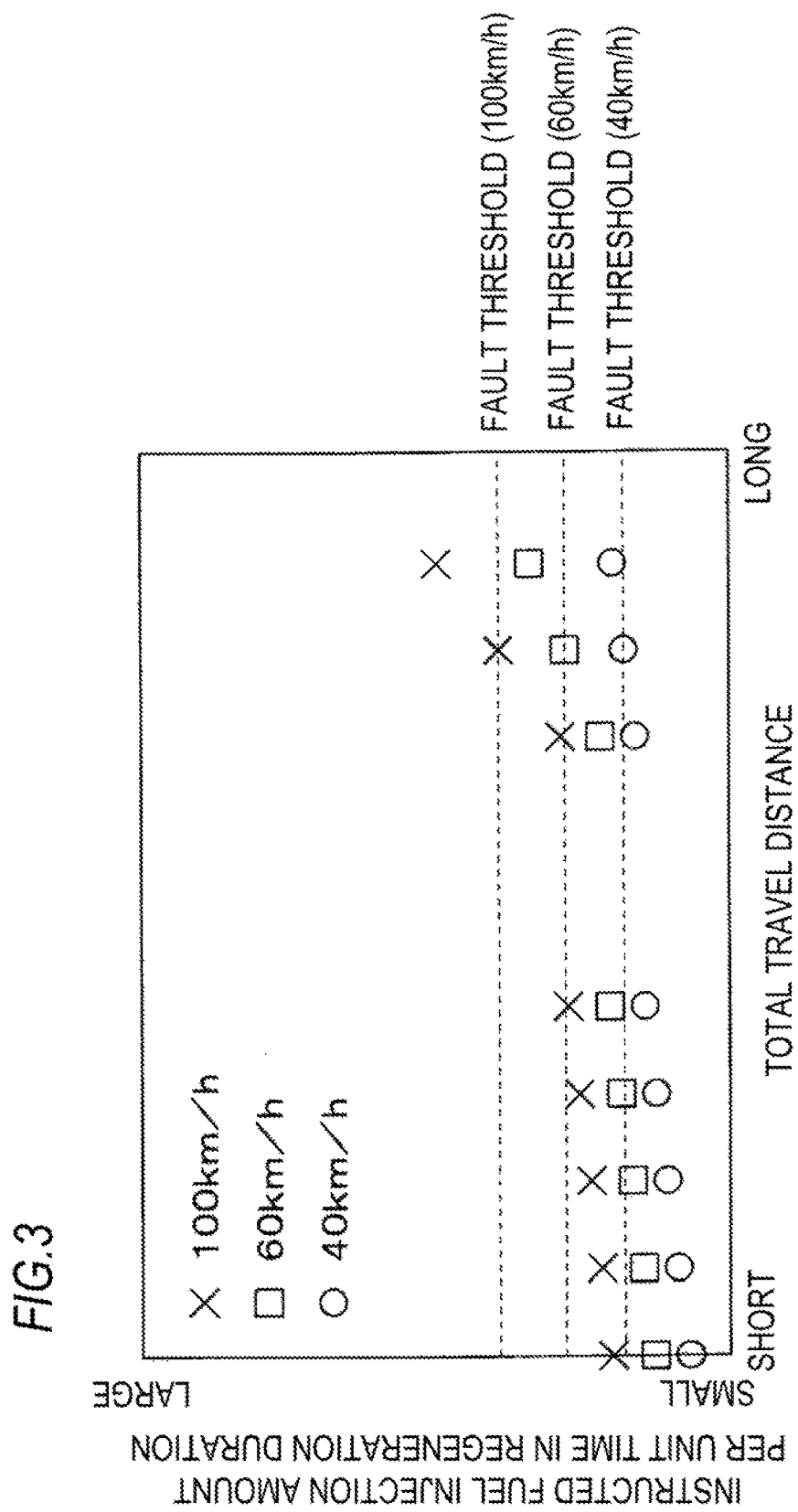

FAULT DIAGNOSIS DEVICE FOR EXHAUST PIPE FUEL INJECTOR

CROSS-REFERENCE TO RELATED APPLICATIONS

This application is a U.S. National Stage entry of PCT Application No. PCT/JP2015/082297, filed on Nov. 17, 2015, which claims priority to Japanese Patent Application No. 2014-235919, filed Nov. 20, 2014, the contents of which are incorporated herein by reference.

TECHNICAL FIELD

The present invention relates to a fault diagnosis device for an exhaust pipe fuel injector for diagnosing normality or an abnormality of the exhaust pipe fuel injector.

BACKGROUND ART

In the background art, is an automobile mounted with a diesel engine, an exhaust pipe fuel injector is adopted to inject a fuel according to an instructed fuel injection amount to an exhaust upstream side of a diesel particulate filter such that a temperature of the diesel particulate filter is raised to a regenerable temperature and the temperature of the diesel particulate filter is maintained to the regenerable temperature in the regeneration duration, so as to combust a particulate matter collected in the diesel particulate filter (for example, see Patent Literature 1 or Patent Literature 2).

CITATION LIST

Patent Literature

Patent Literature 1: JP-A-2006-316757
Patent Literature 2: JP-A-2006-316758

SUMMARY

Technical Problem

However, in the exhaust pipe fuel injector, the nozzle hole is closed due to time-elapse deterioration so that an actual fuel injection amount is gradually reduced, and thus the fuel cannot be injected according to an instructed fuel injection amount. Therefore, there is needed a fault diagnosis device for an exhaust pipe fuel injector which diagnoses a normality or an abnormality of the exhaust pipe fuel injector.

In this regard, an object of the present invention is to provide a fault diagnosis device for an exhaust pipe fuel injector for diagnosing a normality or an abnormality of the exhaust pipe fuel injector.

Solution to Problem

In the present invention designed for achieving the object, a fault diagnosis device for an exhaust pipe fuel injector diagnoses a normality or an abnormality of the exhaust pipe fuel injector which injects a fuel according to an instructed fuel injection amount to an exhaust upstream side of a diesel particulate filter such that a temperature of the diesel particulate filter is raised to a regenerable temperature, and the temperature of the diesel particulate filter is maintained to the regenerable temperature in a regeneration duration, so as to combust a particulate matter collected in the diesel particulate filter. The fault diagnosis device includes a storage unit which stores the regeneration duration and an instructed fuel injection amount in the regeneration duration, a calculation unit which calculates an instructed fuel injection amount per unit time in the regeneration duration, and a fault diagnosis unit which diagnoses that the exhaust pipe fuel injector is abnormal when the instructed fuel injection amount per unit time in the regeneration duration exceeds a fault threshold, and diagnoses that the exhaust pipe fuel injector is normal when the instructed fuel injection amount per unit time in the regeneration duration does not exceed the fault threshold.

Preferably, the fault diagnosis device further includes a fault diagnosis permitting unit which permits diagnosis of the fault diagnosis unit only when a vehicle speed in the regeneration duration is within a prescribed range.

Preferably, the fault diagnosis device further includes a fault threshold changing unit which changes the fault threshold according to the vehicle speed in the regeneration duration.

Preferably, the fault diagnosis device further includes a notification unit which notifies a margin degree up to the time when the fault diagnosis unit diagnoses that the exhaust pipe fuel injector is abnormal, based on a degree of deviation between the instructed fuel injection amount per unit time in the regeneration duration and the fault threshold.

BRIEF DESCRIPTION OF DRAWINGS

FIG. 2 is a schematic view illustrating an example of a relation between a total travel distance and an integrated value of an instructed fuel injection amount in regeneration duration.

FIG. 3 is a schematic view illustrating an example of a vehicle-speed-dependency of the regeneration duration and the instructed fuel injection amount in the regeneration duration.

DESCRIPTION OF EMBODIMENTS

Figure 1:
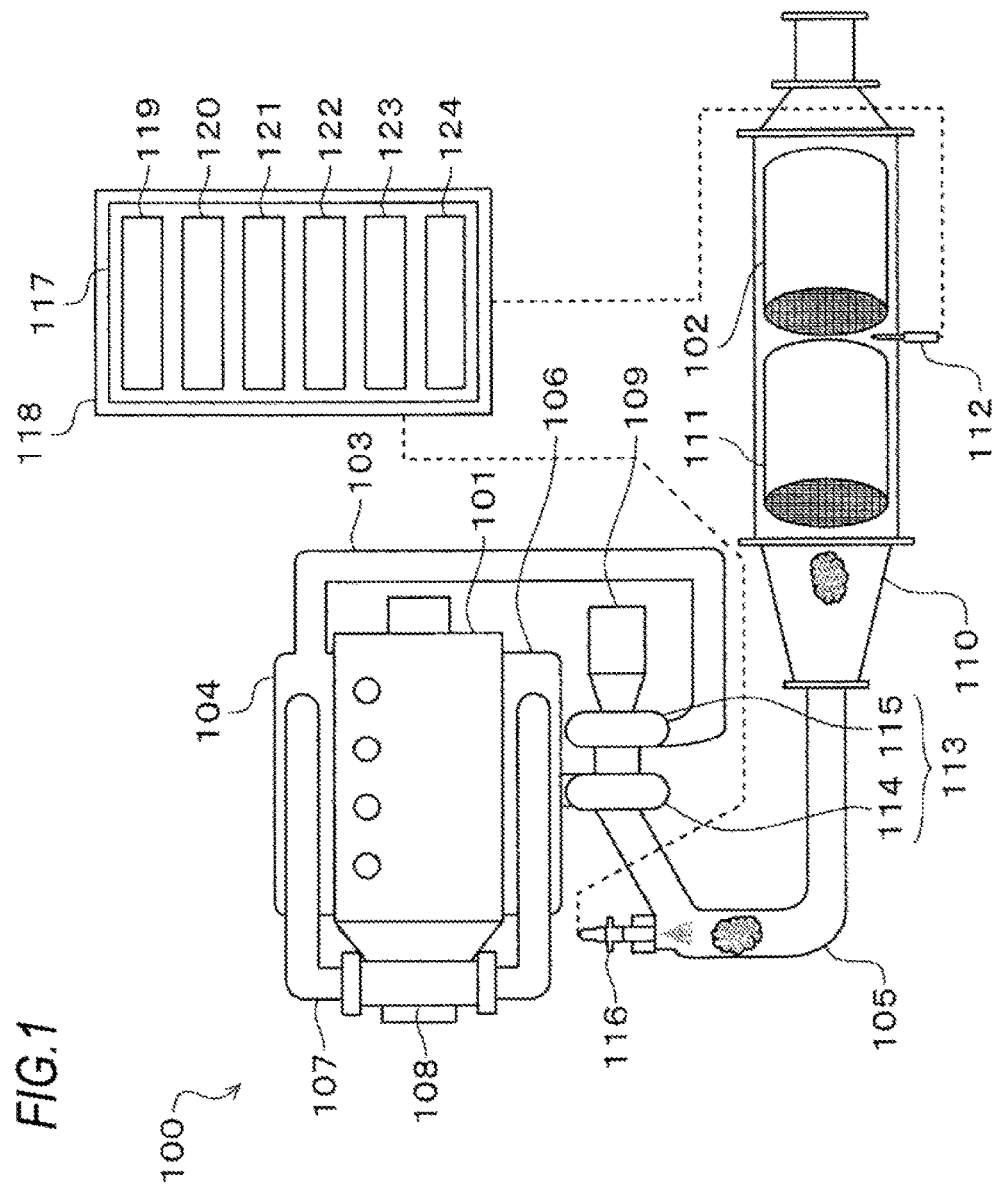
FIG. 1 is a schematic view illustrating an example of a diesel particulate filter device mounted with a fault diagnosis device for an exhaust pipe fuel injector according to the present invention.

Hereinafter, preferred embodiments of the present invention will lie described with reference to the accompanying drawings.

As illustrated in FIG. 1, a diesel particulate filter (DPI) device 100 includes a diesel particulate filter 102 which collects a particulate matter (PM) in an exhaust gas discharged from the internal combustion engine 101 such as a diesel engine so as to reduce a discharge amount of the particulate matter discharged to the atmosphere. In the diesel particulate filter device 100, when the deposition amount of the particulate matter in the diesel particulate filter 102 exceeds the threshold, the regeneration of the diesel particulate filter 102 is performed in such a manner that the temperature of the diesel particulate filter 102 is raised to a regenerable temperature (for example, about 500 degrees Celsius), and the temperature of the diesel particulate filter 102 is maintained to the regenerable temperature in the regeneration duration (for example, about 5 minutes) so as to combust the particulate matter collected in the diesel particulate filter 102.

The internal combustion engine 101 includes an intake manifold 104 which is connected to an intake pipe 103 and branches intake air introduced to the internal combustion engine 101 through the intake pipe 103 to each of the combustion chambers of the internal combustion engine 101, and an exhaust manifold 106 which is connected to an exhaust pipe 105 and joins the exhaust gas discharged from each of the combustion chambers of the internal combustion engine 101 to the exhaust pipe 105.

The intake manifold 104 and the exhaust manifold 106 communicate with each other through an exhaust recirculation (EGR) pipe 107, and thus the exhaust gas discharged from the internal combustion engine 101 is recirculated again, as intake air introduced to the internal combustion engine 101. At this time, the exhaust gas is cooled through an exhaust recirculation cooler 108 provided in the exhaust recirculation pipe 107 to be recirculated as intake air.

In the internal combustion engine 101, the intake air is introduced to the internal combustion engine 101 through the intake pipe 103, and goes through a combustion step, and the exhaust gas is discharged through the exhaust pipe 105 from the internal combustion engine 101. At this time, the intake air, which is introduced to the internal combustion engine 101 through an intake control device 109 provided in the intake pipe 103, is purified and the exhaust gas, which is discharged to the atmosphere through an exhaust control device 110 provided in the exhaust pipe 105, is purified.

The exhaust control device 110 includes a diesel oxidation catalyst (DOC) 111 which oxidizes a soluble organic fraction (SOF) constituent in the particulate matter included in the exhaust gas discharged to the atmosphere through the exhaust pipe 105 or a nitrogen monoxide in the exhaust gas discharged to the atmosphere through the exhaust pipe 105, and the diesel particulate filter 102 provided on the exhaust downstream side of the diesel oxidation catalyst 111. An exhaust temperature detector 112 which detects the temperature of the diesel particulate filter 102 (that is, the temperature of the exhaust gas in the inlet of the diesel particulate filter 102) is provided between the diesel oxidation catalyst 111 and the diesel particulate filter 102.

Incidentally, in the diesel particulate filter device 100, a supercharger 113 is provided between the intake pipe 103 and the exhaust pipe 105. Therefore, a prime mover 114 of the supercharger 113 provided in the exhaust pipe 105 is driven by the exhaust gas discharged from the internal combustion engine 101, and thus, a compressor 115 of the supercharger 113 provided in the intake pipe 103 is driven to supercharge the intake air which is introduced to the internal combustion engine 101 through the intake pipe 103.

In the diesel particulate filter device 100, as a unit which adds an unburned fuel in the exhaust gas discharged to the atmosphere through the exhaust pipe 105, an exhaust pipe fuel injector 116 which injects the fuel according to an instructed fuel injection amount is mounted on the exhaust upstream side of the diesel particulate filter 102. Then, the unburned fuel is added in the exhaust gas discharged to the atmosphere through the exhaust pipe 105, and the unburned fuel is oxidized and combusted by the diesel oxidation catalyst 111, so that the temperature of the exhaust gas discharged to the atmosphere through the exhaust pipe 105 is raised, then the temperature of the diesel particulate filter 102 is raised to the regenerable temperature, and such a state is maintained.

As described above, in the exhaust pipe fuel injector 116, a nozzle hole is closed due to time-elapse deterioration, an actual fuel injection amount is gradually reduced, and thus the fuel cannot be injected according to the instructed fuel injection amount. Therefore, there is needed a fault diagnosis device 117 for the exhaust pipe fuel injector for diagnosing a normality or an abnormality of the exhaust pipe fuel injector 116.

The fault diagnosis device 117 for the exhaust pipe fuel injector according to the preferred embodiment of the present invention is realized by a program, hardware, or the like, and is mounted in an internal combustion engine control apparatus (ECU) 118. The fault diagnosis device 117 for the exhaust pipe fuel injector includes a storage unit 119 which stores the regeneration duration and the instructed fuel injection amount in the regeneration duration, a calculation unit 120 which calculates the instructed fuel injection amount (the integrated value of the instructed fuel injection amount in the regeneration duration/the regeneration duration) per unit time in the regeneration duration, and a fault diagnosis unit 121 which diagnoses that the exhaust pipe fuel injector 116 is abnormal when the instructed fuel injection amount per unit time in the regeneration duration exceeds a fault threshold, and diagnoses that the exhaust pipe fuel injector 116 is normal when the instructed fuel injection amount per unit time in the regeneration duration does not exceed the fault threshold.

Herein, in the regeneration duration, in a case where the deposition amount of the particulate matter in the diesel particulate filter 102 is large, it takes a long time to combust the particulate matter, and in a case where the deposition amount of the particulate matter in the diesel particulate filter 102 is small, it takes a short time to combust the particulate matter. In addition, the regeneration of the diesel particulate filter 102 may be suspended by an operation of a driver, and thus the regeneration duration is not necessarily fixed.

For this reason, in a case where the normality or the abnormality of the exhaust pipe fuel injector 116 is simply diagnosed based on the integrated value of the instructed fuel injection amount in the regeneration duration, the integrated value or the instructed fuel injection amount becomes large when the regeneration duration is long, and the integrated value of the instructed fuel injection amount becomes small when the regeneration duration is short. Therefore, the normality or the abnormality of the exhaust pipe fuel injector 116 can be diagnosed only in a case where the same regeneration duration is constant, and data in a case where the regeneration duration is not satisfied with a prescribed time or exceeds the prescribed time becomes vain.

For example, as illustrated in FIG. 2, in a case where the regeneration duration is not satisfied with the prescribed time, the integrated value of the instructed fuel injection amount in the regeneration duration is extremely small. Therefore, a degree of deviation between the integrated value of the instructed fuel injection amount in the regeneration duration and the fault threshold becomes large, and it is determined that the exhaust pipe fuel injector 116 is normal. However, actually, the instructed fuel injection amount is large compared to the regeneration duration, and it may be assumed that the exhaust pipe fuel injector 116 is abnormal.

In other words, there is a risk that the data in a case where the regeneration duration is not satisfied with the prescribed time or exceeds the prescribed time is used to cause an erroneous diagnosis. Further, the data in a case where the regeneration duration is not satisfied with the prescribed time or exceeds the prescribed time cannot be used to diagnose the normality or the abnormality of the exhaust pipe fuel injector 116.

With respect thereto, in the fault diagnosis device 117 for the exhaust pipe fuel injector, the fault diagnosis unit 121 diagnoses the normality or the abnormality of the exhaust pipe fuel injector 116 based on the instructed fuel injection amount per unit time in the regeneration duration. Therefore, the data in a case where the regeneration duration is not satisfied with the prescribed time or exceeds the prescribed time also can be effectively used to diagnose the normality or the abnormality of the exhaust pipe fuel injector 116.

Incidentally, as illustrated in FIG. 3, the instructed fuel injection amount per unit time in the regeneration duration has a high vehicle-speed-dependency. In a case where the vehicle speed is high, the instructed fuel injection amount per unit time in the regeneration duration is large, and in a case where the vehicle speed is low, the instructed fuel injection amount per unit time in the regeneration duration is small.

It is because a cooling effect of a traveling air becomes large in a case where the vehicle speed is high, so that more fuel is required to maintain the temperature of the diesel particulate filter 102 to the regenerable temperature, and the cooling effect of the traveling air becomes small in a case where the vehicle speed is low, so that less fuel is required to maintain the temperature of the diesel particulate filter 102 to the regenerable temperature.

For this reason, preferably, the fault diagnosis device 117 for the exhaust pipe fuel injector further includes a fault diagnosis permitting unit 122 which permits a diagnosis of the fault diagnosis unit 121 only in a case where the vehicle speed in the regeneration duration is within a prescribed range, and a fault threshold changing unit 123 which changes the fault threshold according to the vehicle speed in the regeneration duration.

Accordingly, the cooling effect of the traveling air is removed so that the normality or the abnormality of the exhaust pipe fuel injector 116 can be diagnosed more accurately.

Incidentally, in the related art, the actual fuel injection amount is significantly reduced due to the time-elapse deterioration of the exhaust pipe fuel injector 116, and the temperature of the diesel particulate filter 102 cannot be raised to the regenerable temperature. Thus, there is mounted with a warning device which gives warning to the driver, for example, by lighting a warning lamp provided in an instrument panel of a driver seat in a case where the regeneration of the diesel particulate filter 102 is not performed.

However, when the warning is given, the abnormality has occurred already in the exhaust pipe fuel injector 116. Therefore, it is necessary to urgently perform maintenance such as cleaning or exchanging of the exhaust pipe fuel injector 116 even while the driver works using the automobile, and thus, the convenience of the conventional warning device is not excellent for the driver.

In this regard, preferably, the fault diagnosis device 117 for the exhaust pipe, fuel injector further includes a notification unit 124 which notifies, through a display unit (not illustrated) and the like, the margin degree (for example, travel distance) up to the time when the fault diagnosis unit 121 diagnoses that the exhaust pipe fuel injector 116 is abnormal, based on a degree of deviation between the instructed fuel injection amount per unit time in the regeneration duration and the fault threshold.

Accordingly, it is possible to notify a cleaning timing, an exchange timing, or the like of the exhaust pipe fuel injector 116 to the driver in advance. Thus, for example, the maintenance can be performed at a timing when the work is not hindered, and the convenience of the driver can be remarkably improved by optimizing the maintenance interval.

Incidentally, although the display unit and the like are not included, as long as an automobile manufacturer notices the margin degree up to the time when the fault diagnosis unit 121 diagnoses that the exhaust pipe fuel injector 116 is abnormal, the fault of the exhaust pipe fuel injector 116 in a periodic inspection timing and the like can be anticipated to suggest a precaution such as the cleaning of the exhaust pipe fuel injector 116 to a user.

As described above, according to the present invention, the fault diagnosis device for the exhaust pipe fuel injector can be provided which diagnoses the normality or the abnormality of the exhaust pipe fuel injector.

The invention claimed is:

1. A fault diagnosis device for an exhaust pipe fuel injector that diagnoses a normality or an abnormality of the exhaust pipe fuel injector which injects a fuel according to an instructed fuel injection amount to an exhaust upstream side of a diesel particulate filter such that a temperature of the diesel particulate filter is raised to a regenerable temperature and the temperature of the diesel particulate filter is maintained to the regenerable temperature in a regeneration duration to combust a particulate matter collected in the diesel particulate filter, the fault diagnosis device performing operations comprising:
   storing the regeneration duration and an instructed fuel injection amount in the regeneration duration;
   calculating an instructed fuel injection amount per unit time in the regeneration duration;
   diagnosing that the exhaust pipe fuel injector is abnormal when the instructed fuel injection amount per unit time in the regeneration duration exceeds a fault threshold, and diagnosing that the exhaust pipe fuel injector is normal when the instructed fuel injection amount per unit time in the regeneration duration does not exceed the fault threshold; and
   changing the fault threshold according to a vehicle speed in the regeneration duration.

2. The fault diagnosis device for the exhaust pipe fuel injector according to claim 1, the operations further comprising:
   permitting the diagnosing only when the vehicle speed in the regeneration duration is within a prescribed range.

3. The fault diagnosis device for the exhaust pipe fuel injector according to claim 1, the operations further comprising:
   notifying a margin degree up to the time when the diagnosing occurs, based on a degree of deviation between the instructed fuel injection amount per unit time in the regeneration duration and the fault threshold, that the exhaust pipe fuel injector is abnormal.

* * * * *